United States Patent [19]

Rademaker

[11] Patent Number: 4,771,373
[45] Date of Patent: Sep. 13, 1988

[54] DC POWER SUPPLY WITH ELECTRONICALLY CONTROLLED POWER DISSIPATION

[75] Inventor: Gerrit Rademaker, Hilversum, Netherlands

[73] Assignee: U.S. Philips Corporation, New York, N.Y.

[21] Appl. No.: 71,693

[22] Filed: Jul. 9, 1987

[30] Foreign Application Priority Data

Jul. 16, 1986 [NL] Netherlands .................. 8601854

[51] Int. Cl.⁴ .......................................... H02P 13/26
[52] U.S. Cl. ........................................ 363/89; 363/86
[58] Field of Search ............... 323/266, 284, 288; 363/46, 47, 89, 124

[56] References Cited

U.S. PATENT DOCUMENTS

| | | | |
|---|---|---|---|
| 3,226,630 | 12/1965 | Lampke | 363/47 X |
| 3,354,380 | 11/1967 | Fly et al. | 363/89 |
| 4,127,895 | 11/1978 | Krueger | 363/86 |
| 4,341,990 | 7/1982 | Davis | 323/303 |
| 4,473,784 | 9/1984 | Morez | 363/124 X |
| 4,685,046 | 8/1987 | Sanders | 363/89 |

Primary Examiner—Patrick R. Salce
Assistant Examiner—Marc S. Hoff
Attorney, Agent, or Firm—Thomas A. Briody; David R. Treacy; Bernard Franzblau

[57] ABSTRACT

A supply circuit for supplying a smoothed direct current to a load comprises a series FET element in series with the load resistance. The supply circuit is fed from the AC supply network via a rectifier 54 and a smoothing capacitor 52 causing a ripple voltage to be present on the input terminals 2-1 and 2-2. The direct voltage component of the input voltage is present across load resistance 60 and the alternating voltage component of the input voltage is present across transistor 10. In the case of known supply voltage circuits the voltage drop across the series element is selected to be equal to the maximum peak-to-peak value of the alternating voltage component thereby causing unnecessary power dissipation to be developed at a minor ripple amplitude. This will cause rapid ageing of the series element. The supply circuit in accordance with the invention comprises a comparator 42 comparing the voltage across FET transistor 10 to a threshold voltage. Comparator 42 controls the charge on the filter capacitors 30 and 32. Consequently, the overall voltage across transistor 10 will never exceed the sum of the threshold voltage and the peak-to-peak voltage of the alternating voltage component of the input voltage.

9 Claims, 1 Drawing Sheet

DC POWER SUPPLY WITH ELECTRONICALLY CONTROLLED POWER DISSIPATION

BACKGROUND OF THE INVENTION

This invention relates to a supply circuit for supplying a smoothed direct current to a load impedance, comprising:

input terminals for receiving a voltage consisting of a direct voltage component and a periodic alternating voltage component superposed thereon having a specified ripple period, output terminals for connecting the load impedance, a series element controllable via a control input and having a main current path connected in series with the load impedance, a low pass filter having an output which provides a voltage with a direct voltage component determined by at least one filter capacitor, and a differential amplifier having an output connected to the control input of the series element, having a first input to which is supplied a voltage proportional to the voltage across the load impedance, and having a second input connected to the output of the low pass filter.

Such a supply circuit is known from "Patent Abstracts of Japan", publication No. 59-170915, publication date 27-9-1984, application No. 58-44442, date of application 18-3-1983.

The supply circuit described in the aforesaid publication comprises a differential amplifier whose output is connected to the base of a bipolar transistor which forms the series element. A first input of this differential amplifier is connected to the tapping point of a voltage divider connected between the output terminals of the supply circuit, and the second input of this differential amplifier is connected to the tapping point of a further voltage divider connected between the input terminals of the supply circuit. Arranged in parallel with a resistance of this further voltage divider is a capacitance, through which an alternating voltage component of the input voltage is short circuited. Thus the input voltage divider together with this capacitance forms a low pass filter. Because of this low pass filter the alternating voltage component has no effect on the output voltage of the differential amplifier, thus on the base voltage of the bipolar transistor. In order that there be no alternating voltage component across the load impedance, the entire alternating voltage component has to appear across the series transistor. For this to be achieved the direct voltage between the collector and the emitter of this series transistor should necessarily be selected equal to at least the peak-to-peak value of the alternating voltage component. This can be achieved by selecting the right resistance values of the two voltage dividers.

This arrangement results in a considerable power dissipation occurring in the series transistor, irrespective of the real amplitude of the alternating voltage component. Consequently, this series transistor continuously operates at a high working temperature leading to fast ageing and a short life of the transistor. This is especially a drawback for systems where high demands are made on the operational reliability, such as for example telecommunication exchanges.

SUMMARY OF THE INVENTION

An object of the invention is to provide a supply circuit of the type mentioned in the preamble wherein the dissipation of the series element is electronically adapted to the actual peak of the alternating voltage component.

To this end the supply circuit in accordance with the invention is characterized in that the supply circuit further comprises:

discharge means for discharging the current from the filter capacitor during at least a part of the ripple period, supply means for providing supply current to the filter capacitor, which supply current is large with respect to the discharge current, a threshold voltage circuit for producing a threshold voltage, and a comparator to be supplied with the threshold voltage, having an input to which the voltage across the series element is applied and having an output connected to the supply means, for making the supply current flow if the voltage across the series element is smaller than the threshold voltage.

The voltage across the series element will generally consist of a direct voltage component and an alternating voltage component. As long as the voltage across the series element exceeds the threshold voltage, a large supply current will flow to the filter capacitor causing the voltage across this capacitor to reach its mean final value (at a steady state of the voltage across the series element). This final value is achieved when the charge supplied to the filter capacitor is equal to the discharge averaged over the ripple period. As the supply current is large relative to the discharge current, current will be supplied for only a very short time, i.e., the current supply-time will be much shorter than the ripple period. As the voltage across the series element is smaller than the threshold voltage for only very short time intervals, the voltage across the series element during these time intervals will only be slightly lower than the threshold voltage. By selecting a very low value for this threshold voltage, the total voltage across the series element will be confined to the sum of this threshold voltage and the peak-to-peak value of the actual alternating voltage component, thus avoiding unnecessary dissipation.

A preferred embodiment of the supply circuit in accordance with the invention is characterized in that the series element is formed by a field effect transistor. By this measure it is achieved that driving the series element does not require any current, a low resistance between drain and source of this series element being possible; for example a 0.2 Ω drain-source resistance is possible at a 2.5 Amp. current, the minimum drain source voltage thus being approximately 0.5 V.

Further preferred embodiments of the supply circuit in accordance with the invention are described in the remaining dependent claims.

BRIEF DESCRIPTION OF THE DRAWING

The invention and its advantages will be described with reference to the accompanying drawing wherein the same reference numerals indicate the same elements and in which.

DESCRIPTION OF THE PREFERRED EMBODIMENTS

Figure 1:
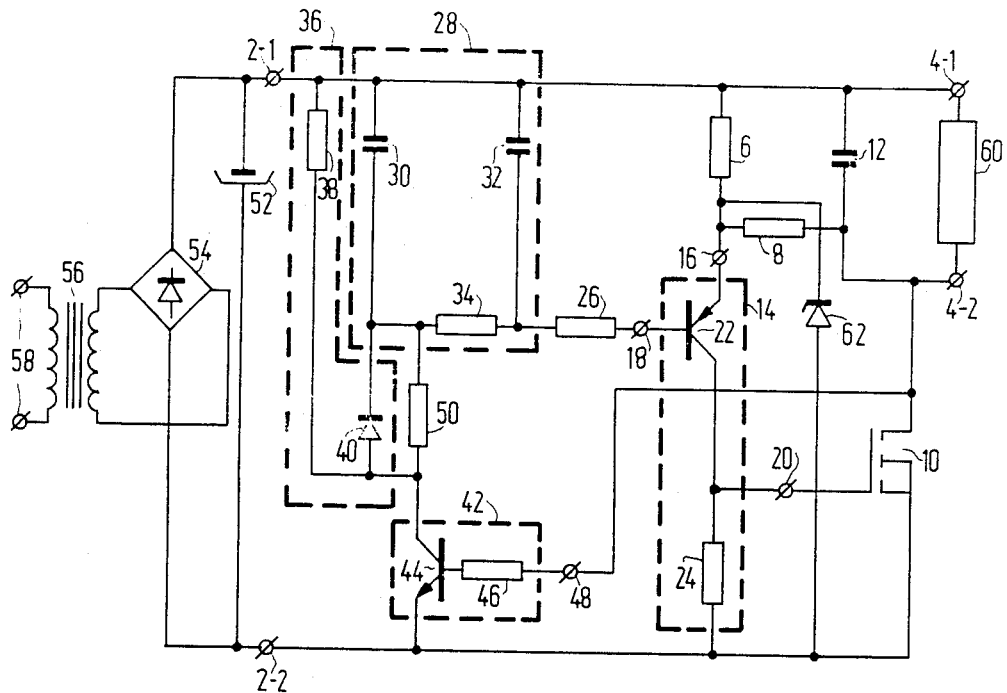
FIG. 1 shows an embodiment of a supply circuit in accordance with the invention.

FIG. 1 shows a supply circuit whose input terminals 2-1 and 2-2 are connected to a voltage consisting of a direct voltage component and a periodic alternating voltage component superposed thereon. A load impedance 60 is connected between the output terminals 4-1 and 4-2. Input terminal 2-1 has a direct connection to output terminal 4-1, input terminal 2-2 being connected to output terminal 4-2 through a series element 10 designed in the form of a field effect transistor (FET). An output capacitor 12 and a voltage divider comprising two resistors 6 and 8 are connected in parallel with load impedance 60. Between the tapping point of this voltage divider and the input terminal 2-2 a differential amplifier 14 is connected. This differential amplifier comprises a first input 16 connected to the tapping point of the aforesaid voltage divider, a second input 18 and an output 20 connected to the control input of transistor 10. Differential amplifier 14 comprises a transistor 22 having an emitter connected to input 16, a base connected to input 18, and a collector resistor 24 on the one hand connected to the collector of transistor 22 and on the other to the input terminal 2-2. The collector of transistor 22 is connected to output 20.

The supply circuit further comprises a low pass filter 28 whose output is connected to input 18 of the differential amplifier 14 via a resistor 26. This low pass filter consists of two capacitors 30 and 32 each being connected on one side to input terminal 2-1; the other sides of these capacitors are interconnected via a resistor 34. The junction point of capacitor 32 and resistor 34 forms the output of the low pass filter 28. The input of this filter is formed by the junction point of capacitor 30 and resistor 34. The values of the components of this low pass filter circuit are chosen such that the cutoff frequency of the filter is much lower than the ripple frequency of the alternating voltage component.

The supply circuit also comprises supply means 36, consisting of a series arrangement of a resistor 38 and a diode 40, which series arrangement is connected between input terminal 2-1 and the input of low pass filter 28.

The supply circuit further comprises a comparator 42 likewise designed as a threshold voltage circuit. This comparator consists of a transistor 44 and a base resistor 46 connected thereto. The right side of resistor 46 forms the input of comparator 42, the collector of transistor 44 forms the output of this comparator and the emitter of transistor 44 is connected to input terminal 2-2. The input of comparator 42 is connected to output terminal 4-2, its output being connected to the input of low pass filter 28 through a resistor 50. Resistor 50 has the function of a current discharge means for discharging the current from the filter capacitor. The output of comparator 42 is likewise connected to the junction point of resistor 38 and diode 40.

The input voltage of the supply circuit is received from the energy network via the mains connection 58. This mains connection forms the primary side of a transformer 56, whose secondary side is connected to a rectifier bridge 54. To the output of this rectifier bridge and also to the input terminals 2-1 and 2-2 a supply capacitor 52 is connected for smoothing the pulsing direct voltage supplied by the rectifier bridge 54.

After the mains voltage is switched on via transformer 56, supply capacitor 52 will be charged. Via load resistor 60 and base resistor 46, transistor 44 is rendered conductive. Consequently, the filter capacitors 30 and 32 are charged via resistor 50 so that transistor 22 is rendered conductive. This causes transistor 10 to receive a positive gate-source voltage and to be rendered conductive, thus decreasing the voltage across transistor 10. This process carries on until the voltage across transistor 10 has come near the threshold voltage of comparator 42. This threshold voltage is formed by the diode forward voltage of the base-emitter diode of transistor 44. At this voltage across transistor 10 the supply circuit in accordance with the invention assumes the steady state, as will be further explained with reference to FIG. 2.

Figure 2:
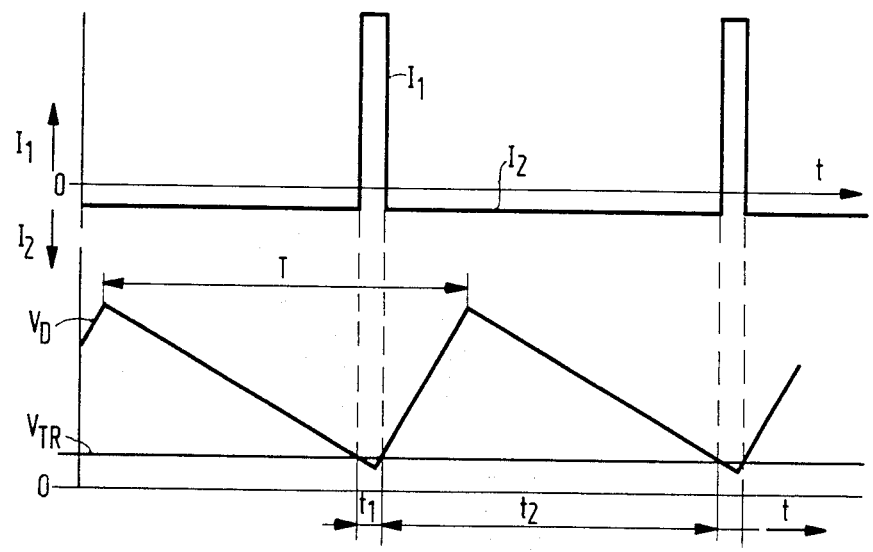
FIG. 2 shows the waveforms of several currents and voltages as a function of time in the supply circuit in accordance with the invention.

The top graph of FIG. 2 shows the waveform of the supply current $I_1$ to filter 28 and the discharge current $I_2$ from filter 28. Supply current $I_1$ is applied to the filter via resistance 38 and diode 40, discharge current $I_2$ from the filter being discharged via resistor 50.

The bottom graph of FIG. 2 shows the waveform of the voltage $V_D$ on the drain of transistor 10, and the threshold voltage $V_{TR}$ of comparator 42. The ripple period is indicated by T, the current supply interval being indicated by $t_1$, the current discharge interval being indicated by $t_2$.

If the drain voltage $V_D$ of transistor 10 exceeds the threshold voltage of comparator 42, transistor 44 will be in the saturated state. Consequently, the collector voltage of transistor 44 will substantially be equal to the voltage of input terminal 2-2. Diode 40 will be rendered non-conductive as a result of which the supply current $I_1$ will be equal to zero. There is a discharge current $I_2$ running through resistor 50 as represented in FIG. 2. The value of this discharge current is determined by the voltage on the capacitors 30 and 32 and the resistance of resistor 50. The voltage on the aforesaid capacitors is substantially equal to the sum of the tapping point voltage of the voltage divider formed by the resistors 6 and 8 and the diode forward voltage of transistor 22. The voltage level across these capacitors is thus determined by the dividing ratio of resistance 6 to resistance 8.

The circuit further comprises a zener diode 62 inserted between the emitter of transistor 22 and the input terminal 2-2. When switching on the mains voltage the collector-emitter voltage could become too large, though in addition, this zener diode likewise limits the gate voltage of transistor 10, which must not exceed for example 20 V.

The moment when the drain voltage of transistor 10 becomes lower than the threshold voltage of comparator 42, transistor 44 will be rendered non-conductive. Consequently, a supply can flow through resistor 38 and diode 40 to the capacitors 30 and 32 of low pass filter 28. This supply current will flow until the drain voltage of transistor 10 exceeds the threshold voltage of comparator 42 again. Resistor 38 will now be selected to be much smaller (for example, a factor of 10) than resistor 50 so that the supply current $I_1$ is much larger than the discharge current $I_2$.

When the supply circuit is in the steady state the charge supplied to the filter capacitors averaged over the ripple period T, has to be as large as the discharge from the filter capacitors. If the supply current $I_1$ far exceeds the discharge current $I_2$, the supply interval $t_1$ will thus be much smaller than the discharge interval $t_2$. The latter situation can only occur if the negative peaks of the drain voltage $V_D$ of transistor 10 fall only slightly below the threshold voltage $V_{TR}$. Thus it is achieved that in the steady state the voltage across transistor 10 never exceeds the sum of the threshold voltage and the peak-to-peak value of the ripple voltage, thus avoiding unneccessary dissipation.

A practical embodiment of the supply circuit in accordance with the invention comprises components as stated in the following table:

| reference numeral | type of component | value or type |
|---|---|---|
| 6 | resistor | 10 kΩ |
| 8 | resistor | 2.7 kΩ |
| 10 | field effect transistor | Philips BUZ 31 |
| 12 | capacitor | 22 μF |
| 22 | PNP-transistor | Philips 2N 2907 |
| 24 | resistor | 100 kΩ |
| 26 | resistor | 2.7 kΩ |
| 30 | capacitor | 22 μF |
| 32 | capacitor | 22 μF |
| 34 | resistor | 2.7 kΩ |
| 38 | resistor | 10 kΩ |
| 40 | diode | Philips BAV 10 |
| 44 | NPN-transistor | Philips BSX 20 |
| 46 | resistor | 1 kΩ |
| 50 | resistor | 100 kΩ |
| 52 | capacitor | 10 mF |
| 62 | zener-diode | Philips BZX 79 |

What is claimed is:

1. A supply circuit for supplying a smoothed direct current to a load impedance, comprising:
   input terminals for receiving a voltage having a direct voltage component and a periodic alternating voltage component superposed thereon, said alternating voltage component having a specified ripple period,
   output terminals for connection to the load impedance,
   a series element controllable via a control input and comprising a main current path connected in series with the load impedance,
   a low-pass filter having an output which develops a voltage having a direct voltage component determined by at least one filter capacitor,
   a differential amplifier having an output connected to the control input of the series element, having a first input which receives a voltage proportional to the voltage across the load impedance, and having a second input connected to the output of the low pass filter,
   discharge means for discharging current from the filter capacitor during at least a part of the ripple period,
   supply means for providing a supply current to the filter capacitor, which supply current is large with respect to the discharge current,
   a threshold circuit for producing a threshold voltage, and a comparator having input means supplied with the threshold voltage and a voltage developed across the series element and having an output connected to the supply means for making the supply current flow if the voltage across the series element is lower than the threshold voltage.

2. A supply circuit as claimed in claim 1, characterized in that the threshold voltage circuit and the comparator are together formed by a transistor having a base-emitter junction connected in parallel with the main current path of the series element, the forward voltage of the base-emitter junction forming the threshold voltage and the collector forming the output of the comparator.

3. A supply circuit as claimed in claim 2, characterized in that the supply means comprise a series arrangement of a resistance and a diode, the series arrangement being connected between one of the input terminals and the filter capacitor with a junction point between the resistance and the diode connected to the comparator output.

4. A supply circuit as claimed in claim 3 wherein the series element comprises a field effect transistor.

5. A supply circuit as claimed in claim 1, characterized in that the low pass filter comprises a parallel circuit of a first filter capacitor with a series arrangement of a resistance and a second filter capacitor, the connections of the first filter capacitor forming the input and the connections of the second filter capacitor forming the output of the filter.

6. A supply circuit as claimed in claim 1 wherein the supply means comprise a series arrangement of a resistor and a diode, the series arrangement being connected between one of the input terminals and the filter capacitor with a junction point between the resistor and the diode connected to the comparator output.

7. A supply circuit as claimed in claim 1 wherein the series element comprises a field effect transistor.

8. A supply circuit as claimed in claim 1 wherein the series element comprises a transistor and the low pass filter comprises, first and second capacitors each having a first terminal coupled to one of said input terminals, and a resistor having first and second terminals connected to a second terminal of the first and second capacitors, respectively, said first and second resistor terminals forming the filter input and output, respectively.

9. A supply circuit as claimed in claim 1 wherein the low pass filter has a cut-off frequency that is much lower than the ripple frequency of the alternating voltage component.

* * * * *